US012535270B2

(12) United States Patent
Chen et al.

(10) Patent No.: US 12,535,270 B2
(45) Date of Patent: Jan. 27, 2026

(54) MATTRESS CENTRIFUGAL DEHYDRATION DEVICE

(71) Applicant: Jiangsu Sea-lion Machinery Co., Ltd., Zhangjiagang (CN)

(72) Inventors: Hong Chen, Zhangjiagang (CN); Shengang Cai, Zhangjiagang (CN); Yexin Li, Zhangjiagang (CN); Lunan Wang, Zhangjiagang (CN); Lei Xia, Zhangjiagang (CN)

(73) Assignee: Jiangsu Sea-Lion Machinery Co., Ltd., Zhangjiagang (CN)

( * ) Notice: Subject to any disclaimer, the term of this patent is extended or adjusted under 35 U.S.C. 154(b) by 692 days.

(21) Appl. No.: 18/051,022

(22) Filed: Oct. 31, 2022

(65) Prior Publication Data

US 2024/0085108 A1 Mar. 14, 2024

(30) Foreign Application Priority Data

Sep. 13, 2022 (CN) .......................... 202211110101.5

(51) Int. Cl.

*F26B 5/08* (2006.01)
*B68G 15/00* (2006.01)
*F26B 11/02* (2006.01)
*F26B 25/00* (2006.01)

(52) U.S. Cl.

CPC ................ *F26B 5/08* (2013.01); *B68G 15/00* (2013.01); *F26B 11/022* (2013.01); *F26B 25/003* (2013.01)

(58) Field of Classification Search

CPC ........ F26B 5/08; F26B 11/022; F26B 25/003; F26B 25/08; F26B 25/18; F26B 11/18; F26B 25/00; F26B 25/185; B68G 15/00
USPC ........................................................ 34/58, 59
See application file for complete search history.

(56) References Cited

FOREIGN PATENT DOCUMENTS

| | | | | | |
|---|---|---|---|---|---|
| CN | 202447343 | U | * | 9/2012 | |
| CN | 213728008 | U | * | 1/2021 | |
| CN | 112264366 | B | * | 8/2021 | ............ F26B 21/004 |
| CN | 215490645 | U | * | 1/2022 | |
| JP | 2000218194 | A | * | 8/2000 | |
| JP | 2004057909 | A | * | 2/2004 | |
| JP | 2005334831 | A | * | 12/2005 | |
| JP | 2007307356 | A | * | 11/2007 | |

* cited by examiner

*Primary Examiner* — John P Mccormack
(74) *Attorney, Agent, or Firm* — Wang Law Firm, Inc.

(57) ABSTRACT

A mattress centrifugal dehydration device which includes a frame body, a dehydration assembly, and a second driving structure. The dehydration assembly has a dehydration rack, a stop member, and a first driving structure. The dehydration rack is rotatably arranged on the frame body, and a loading member of a mattress is arranged on the dehydration rack, and the loading member has a loading surface. The stop member is arranged above the loading member, the stop member has a stop surface, and an accommodating space of the mattress is formed between the stop surface and the loading surface; the first driving structure is arranged on the dehydration rack and acts on the stop member to drive it to be close to or away from the loading member so as to reduce or enlarge the accommodating space.

10 Claims, 2 Drawing Sheets

MATTRESS CENTRIFUGAL DEHYDRATION DEVICE

TECHNICAL FIELD

The present invention relates to mattress automatic cleaning systems, and more particularly to a mattress centrifugal dehydration device.

BACKGROUND ART

A mattress after cleansing is typically squeezed by a roller and then transported directly to a drying room for further drying. However, when the mattress is squeezed by the roller, only a small amount of water in the mattress can be discharged. When the mattress in this state is sent to the drying room, it takes a long time to make the mattress completely dry. In order to improve the drying efficiency, a patent for invention with the application number CN201910521267.8 discloses a multi-station mattress cleaning machine, which adds a spin-drying device between the rinsing and drying processes and spin-dries the mattress by providing a cylindrical spin-drying tank so as to reduce the drying time of the next process. However, a cylindrical spin-drying tank, which is not conducive to the entry and removal of the mattress, also requires manual intervention and adjustment in the pre-spin or post-spin process.

The information disclosed in this background art is intended merely to enhance the understanding of the overall background art of the invention and should not be taken as an admission or any suggestion in any form that such information constitutes the prior art known to a person of ordinary skills in the art.

SUMMARY OF THE INVENTION

It is an object of the present invention to provide a mattress centrifugal dehydration device, which can be adapted to the assembly line work of mattress cleaning and spin-dry the mattress after it has been cleaned or rinsed in the previous process, and transfer the same to the next process for drying, with a high degree of automation and good dehydration effect.

To achieve the above object, an embodiment of the present invention provides a mattress centrifugal dehydration device including a frame body, a dehydration assembly, and a second driving structure. The dehydration assembly comprises a dehydration rack, a stop member, and a first driving structure. The dehydration rack is rotatably arranged on the frame body, and a loading member of a mattress is arranged on the dehydration rack, the loading member having a loading surface. The stop member is arranged above the loading member, the stop member has a stop surface, and an accommodating space of the mattress is formed between the stop surface and the loading surface; the first driving structure is arranged on the dehydration rack and acts on the stop member to drive it to be close to or away from the loading member so as to reduce or enlarge the accommodating space. The second driving structure is arranged on the frame body and connected to the dehydration rack so as to drive the dehydration rack to self-rotate.

In one or more embodiment of the present invention, a transport channel of the mattress is formed between the stop member and the loading member, the transport channel has an inlet and an outlet, and the inlet and the outlet are both provided with a transfer assembly of the mattress.

In one or more embodiment of the present invention, the transfer assembly is provided on the dehydration rack, the transfer assembly comprising a rotatable transfer roller, and the transfer roller having an uppermost position no lower than an upper end face of the loading member.

In one or more embodiment of the present invention, a third driving structure is connected to the transfer roller.

In one or more embodiment of the present invention, the second driving structure is connected to the dehydration rack between the stop member and the loading member.

In one or more embodiment of the present invention, the loading member comprises a loading plate having multiple drainage holes formed therethrough.

In one or more embodiment of the present invention, the multiple loading plates are arranged in an array on said dehydration rack, the multiple loading plates all lying in the same plane.

In one or more embodiment of the present invention, the stop member comprises a stop plate, the stop plate being provided with multiple drainage holes therethrough.

In one or more embodiment of the present invention, an edge of the stop plate is surrounded by a stop frame, a reinforcing rib is provided on the stop frame above the stop plate, and the first driving structure is connected to the reinforcing rib.

In one or more embodiment of the present invention, the mattress centrifugal dehydration device further comprises a water-resisting plate provided on the frame body to enclose to form an enclosed chamber, wherein the dehydration assembly is provided within the enclosed chamber, and the second driving structure is provided outside the enclosed chamber.

In one or more embodiment of the present invention, the enclosed chamber has an openable and closable chamber door that is provided opposite the inlet and/or outlet of the transport channel when the loading member in the dehydration assembly is in a horizontal state.

In one or more embodiment of the present invention, the mattress centrifugal dehydration device further comprises a water-containing tank provided within the enclosed chamber and below the dehydration rack.

In one or more embodiment of the present invention, the loading member includes symmetrically provided transfer rollers, a driving belt sleeved over the transfer rollers, and a support member positioned between the transfer rollers to support the mattress.

Compared with the prior art, according to an embodiment of the present invention, a transport channel (a receiving space) of a mattress is formed between a loading member and a stop member which are oppositely arranged. Such transport channel can better adapt to the assembly line work of mattress cleaning, facilitate the reception of the mattress cleaned or rinsed during the previous process, and facilitate to transfer the spin-dried mattress to the next drying process, with a high degree of automation and a good dehydration effect.

The mattress centrifugal dehydration device according to the embodiment of the present invention is provided with a stop member which is movable relative to the loading member. The stop member presses out part of the water in the mattress located above the loading member and in cooperation with the loading member, limit the movement of the mattress and then drives the two to over turn simultaneously via the second driving structure to spin-dry the mattress, so as to further improve the dehydration effect. At the same time, the water pressing step at the early stage can reduce the weight of the mattress as much as possible, facilitating the spin-drying operation at the later stage.

In the mattress centrifugal dehydration device according to the embodiment of the present invention, drainage holes are provided through both the loading member and the stop member, so as to facilitate the water in the mattress to be spinned out during the rotary spin-drying process.

The mattress centrifugal dehydration device according to the embodiment of the present invention is provided with a transfer assembly at two ends of a delivering channel for automatically moving the mattress between the device and the device of the previous process and the next process associated with the present device.

The mattress centrifugal dehydration device according to the embodiment of the present invention can prevent water spinned out from the mattress from splashing into the environment and causing environmental pollution when the mattress is spin-dried by providing an enclosed chamber and a water-containing tank.

DETAILED DESCRIPTION OF THE INVENTION

The specific embodiments of the present invention are described in detail below in combination with the drawings, but it should be understood that the scope of protection of the present invention is not limited by the specific embodiment.

Unless otherwise expressly stated, in the entire specification and claims, the term "including" or its transformations such as "comprising" or "comprises" will be understood to include the stated elements or components, without excluding other elements or other components.

As described in the background art, a mattress spin-drying device in the prior art, when being applied to the assembly line work of automated mattress cleaning, has a problem of inconvenience in transportation and also has a problem of uneven stress during rotary spin-drying.

For the above-mentioned technical problems, the present invention creatively proposes a mattress centrifugal dehydration device, where a transport channel 4 (including a receiving space) having an inlet and an outlet is constructed by means of parallel and oppositely arranged loading members and stop members. It is applicable to the assembly line work of automatic mattress cleaning.

Figure 1:
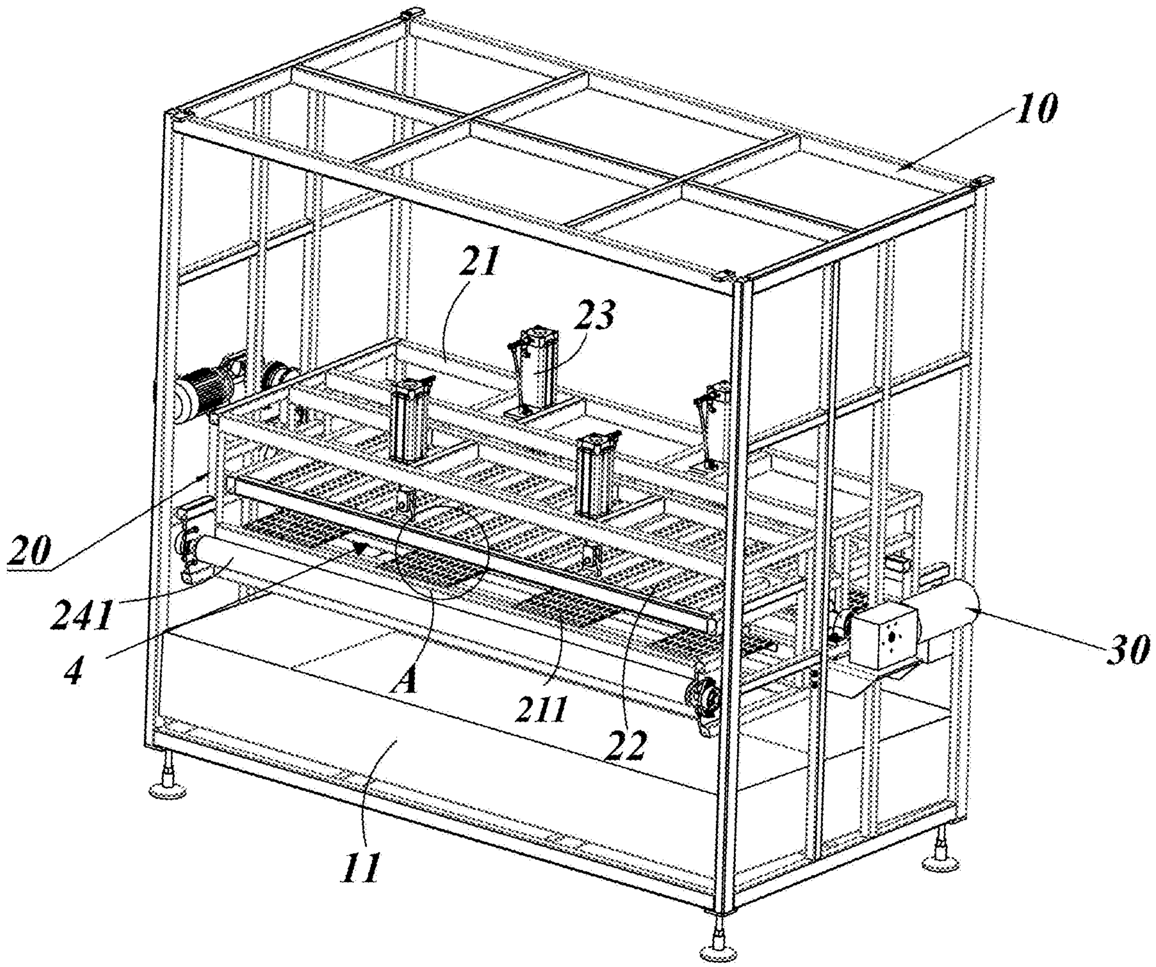
FIG. 1 is a perspective view showing a mattress centrifugal dehydration device according to an embodiment of the present invention.

As shown in FIG. 1, an embodiment of the present invention provides a mattress centrifugal dehydration device comprising a frame body 10, a dehydration assembly 20, and a second driving structure 30. The dehydration assembly 20 is rotatably arranged on the frame body 10, and a mattress receiving space is formed in the dehydration assembly 20. The second driving structure 30 is provided on the frame body 10 and is connected to the dehydration assembly 20, and drives the same to self-rotate to spin-dry the mattress.

The frame body 10 is constructed substantially in the form of a cubic frame-shaped structure, and is provided with a water-resisting plate (not shown) that wraps around the frame body 10 to enclose to form an enclosed chamber. The chamber can prevent the splashing of water spinned out from the mattress into the environment. Openable and closable door bodies (not shown) are provided on the water-resisting plates on two opposite sides of the frame body 10, and the door bodies are driven by a vertical cylinder so that the mattress centrifugal dehydration device of the present invention can be used in combination with other washing systems, such as a subsequent drying device, a preceding rinsing device, etc.

The dehydration assembly 20 is arranged in the enclosed chamber, and the dehydration assembly 20 comprises a dehydration rack 21, a stop member 22, and a first driving structure 23.

The dehydration rack 21 is provided in a substantially rectangular parallelepiped structure, and is spliced by multiple frame bodies to form a frame-shaped structure. In other embodiments, the dehydration rack 21 may also be a cubic or polygonal cylinder or a sphere structure at least having one central axis. The dehydration rack 21 is rotatably connected to the frame body 10, and the connection between the frame body 10 and the dehydration rack 21 is located on the central axis of the dehydration rack 21 in order to prevent gravity offset when the dehydration rack 21 rotates. The dehydration rack 21 is provided with a loading member 211 of the mattress, the loading member 211 having a flat loading surface.

Figure 2:
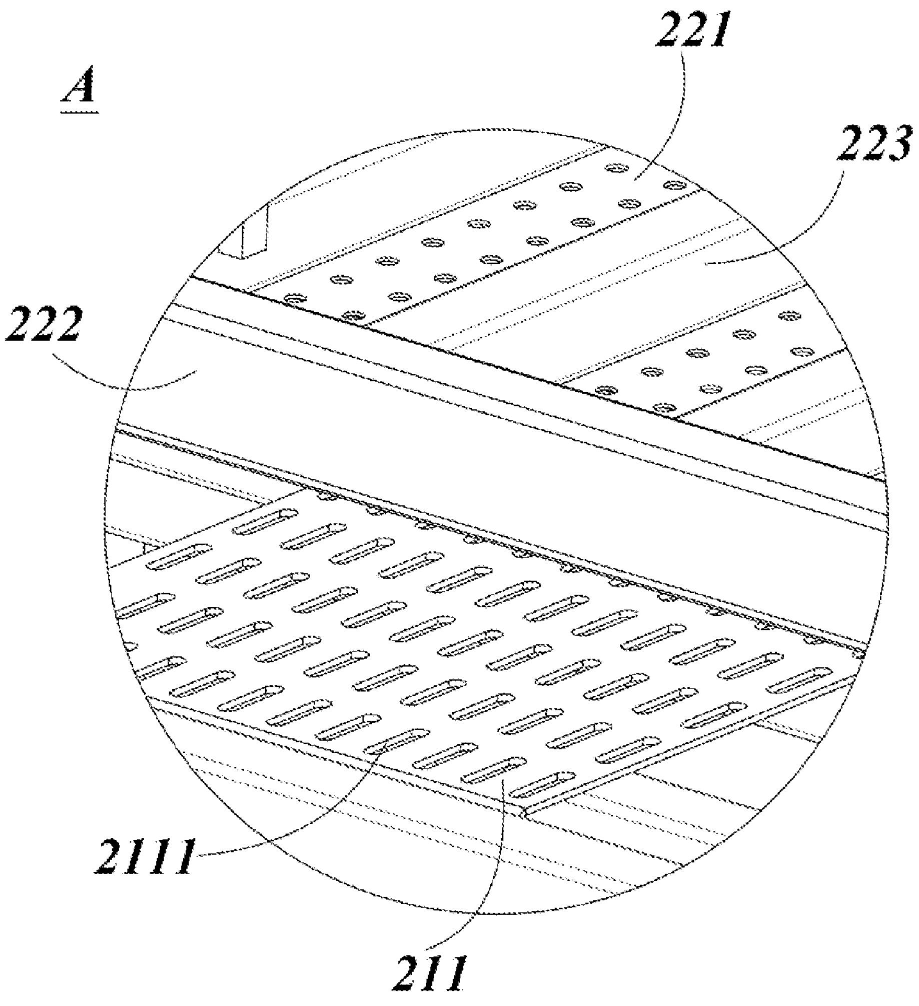
FIG. 2 is a detailed view of portion A of a mattress centrifugal dehydration device according to an embodiment of the present invention.

In a specific embodiment, as shown in FIG. 2, the loading member 211 comprises a loading plate, multiple drainage holes 2111 being provided through the loading plate. The loading plate may be a one-piece plate structure that conforms to the size of the mattress. The loading plate may also have a plate structure with a small size, multiple loading plates are arranged in an array on the dehydration rack 21, adjacent loading plates are arranged immediately adjacent or at intervals, and multiple loading plates are all located in the same plane so as to be spliced to form a loading surface conforming to the size of the mattress.

The stop member 22 is arranged above the loading member 211, the stop member 22 has a stop surface, and an accommodating space of the mattress is formed between the stop surface and the loading surface. A transport channel 4 of the mattress is formed between the stop member 22 and the loading member 211, and the accommodating space is located in the transport channel 4. The transport channel 4 has an inlet and an outlet, both of which are provided with a transfer assembly of the mattress. In a particular embodiment, a transfer assembly is arranged on the dehydration rack 21, the transfer assembly comprising a rotatably arranged transfer roller 241, and the highest position of the transfer roller 241 being not lower than the upper end face of the loading member 211. A third driving structure (not shown) is connected to the transfer roller 241. When the loading member 21 in the dehydration assembly 20 is in a horizontal state, the openable door body and the closable door body on the water-resisting plate are arranged opposite the inlet and the outlet of the transport channel 4, respectively. The mattress is transferred along the transport channel 4 under the influence of the transfer assembly into the accommodating space between the stop member 22 and the loading member 211, and after spin-drying, is transferred along the transport channel 4 by the transfer assembly to the next process.

In this embodiment, the stop member 22 comprises a stop plate 221 and a stop frame 222. The stop plate 221 may also be a one-piece plate structure conforming to the size of the mattress. Multiple drainage holes are provided through the stop plate 221, as shown in FIG. 2. A stop frame 222 is provided around the edge of the stop plate 221, a reinforcing rib 223 is provided on the stop frame 222 above the stop plate 221, and the reinforcing rib 223 and the stop frame 222 can enhance the overall strength of the stop plate 221 so that the stop plate 221 can provide a certain degree of pressure when acting on the mattress, and cannot easily break and damage.

In the present embodiment, the lower surface of the stop frame 222 is lower than the lower surface of the stop plate 221 so that when the stop member 22 applies pressure to the mattress, the stop frame 222 partially extends over the four side surfaces of the mattress to limit the mattress to prevent it from being thrown off when the dehydration rack 21 rotates.

The first driving structure 23 is arranged above the dehydration rack 21, and its output shaft is connected to the reinforcing rib 223 of the stop member 22 to drive the stop member 22 to be close to or away from the loading member 21 to reduce or enlarge the accommodating space. The first driving structure 23 may be a pressure cylinder.

The second driving structure 30 is provided on the frame body 10 and is connected to the dehydration rack 21. In the present embodiment, the second driving structure 30 is located outside the enclosed chamber, and the output shaft of the second driving structure 30 is also located on the central axis of the dehydration rack 21 so as to drive the dehydration rack 21 to self-rotate. The second driving structure 30 may be a rotary motor.

Since the use environment of the mattress centrifugal dehydration device of the present invention is an assembly-line automatic mattress cleaning system, in order to save water resources and not pollute the surrounding environment, the enclosed chamber of the frame body 10 is further provided with a water-containing tank 11, which is located below the dehydration rack 21 and has a size greater than or equal to the size of the dehydration rack 21, and preferably, has a length and a width corresponding to those of the enclosed chamber. The water-containing tank 11 can be, through a pipe, in communication with a spray pipe in the rinsing equipment of the mattress centrifugal dehydration device of the previous process so that the collected water can be used for spray rinsing.

In the present embodiment, the loading member 21 is a plate-like structure with a drainage hole. In other embodiments, the loading member 21 may also be a loading component directly composed of a transfer roller and a driving belt, the transfer roller rotating under the action of the third driving structure to drive the conveying belt to move so as to transport the mattress. Since the process of pressing down the stop member to squeeze some water in the mattress is provided before the mattress is spin-dried, only the transfer roller and the driving belt may not be sufficient to support the mattress to carry on the pressing down force and the centrifugal force during the spin-drying process. Therefore, a support member, which may be a support rod or a support plate, is further provided on the dehydration rack between two transfer rollers.

Compared with the prior art, a transport channel 4 (a receiving space) of a mattress is formed between a loading member and a stop member which are oppositely arranged to better adapt to the assembly line work of mattress cleaning, facilitate to carry on the mattress cleaned or rinsed by the previous process, and facilitate to transfer the spin-dried mattress to the next drying process, with a high degree of automation and a good dehydration effect.

The mattress centrifugal dehydration device according to the embodiment of the present invention, by being provided with a stop member movable relative to the loading member, firstly preliminarily presses out part of the water in the mattress located above the loading member while stop the mattress in cooperation with the loading member, and then drives the two to overturn simultaneously via the second driving structure to spin-dry the mattress, so as to further improve the dehydration effect. At the same time, the water pressing step at the early stage can reduce the weight of the mattress as much as possible, facilitating the spin-drying operation at the later stage.

In the mattress centrifugal dehydration device according to the embodiment of the present invention, drainage holes are provided through both the loading member and the stop member, so as to facilitate the water in the mattress to be spinned out during the rotary spin-drying process.

The mattress centrifugal dehydration device according to the embodiment of the present invention is provided with a transfer assembly at two ends of a delivering channel for automatically moving the mattress between the device and the device of the previous process and the next process associated with the present device.

The mattress centrifugal dehydration device according to the embodiment of the present invention can prevent water spinned out from the mattress from splashing into the environment and causing environmental pollution when the mattress is spin-dried by providing an enclosed chamber and a water-containing tank.

The foregoing description of specific exemplary embodiment of the present invention is for purposes of illustration and examples. The description is not intended to limit the invention to the precise form disclosed, and it is clear that many changes and variations can be made according to the above teachings. The purpose of selecting and describing exemplary embodiments is to explain the specific principles and practical applications of the invention so that those skilled in the art can realize and utilize various exemplary embodiment of the invention, as well as various choices and changes. The scope of the invention is intended to be defined by the claims and equivalents thereof.

What is claimed is:

1. A mattress centrifugal dehydration device, comprising:

a frame body;

a dehydration assembly comprising:

- a dehydration rack rotatably arranged on the frame body, wherein a loading member for loading and supporting a mattress is arranged on the dehydration rack and the loading member has a loading surface;
- a stop member arranged above the loading member, wherein the stop member has a stop surface, and an accommodating space of the mattress is formed between the stop surface and the loading surface; and
- a first driving structure arranged on the dehydration rack and acts on the stop member to drive it to be close to or away from the loading member so as to reduce or enlarge the accommodating space; and a second driving structure arranged on the frame body and connected to the dehydration rack so as to drive the dehydration rack to self-rotate;

wherein a transport channel of the mattress is formed between the stop member and the loading member, the transport channel has an inlet and an outlet, and the inlet and the outlet are both provided with a transfer assembly of the mattress; the transfer assembly is provided on the dehydration rack, the transfer assembly comprising a rotatable transfer roller, and the transfer roller having an uppermost position no lower than an upper end face of the loading member.

2. The mattress centrifugal dehydration device of claim 1, wherein a third driving structure is connected to the transfer roller.

3. The mattress centrifugal dehydration device of claim 1, wherein the second driving structure is connected to the dehydration rack between the stop member and the loading member.

4. The mattress centrifugal dehydration device of claim 1, wherein the loading member comprises a loading plate having multiple drainage holes formed therethrough.

5. The mattress centrifugal dehydration device of claim 4, wherein multiple loading plates are arranged in an array on said dehydration rack, the multiple loading plates all lying in the same plane.

6. The mattress centrifugal dehydration device of claim 1, wherein the stop member comprises a stop plate, the stop plate being provided with multiple drainage holes therethrough.

7. The mattress centrifugal dehydration device of claim 6, wherein an edge of the stop plate is surrounded by a stop frame, a reinforcing rib is provided on the stop frame above the stop plate, and the first driving structure is connected to the reinforcing rib.

8. The mattress centrifugal dehydration device of claim 1, further comprising a water-resisting plate enclosed on the frame body to form an enclosed chamber, wherein the dehydration assembly is provided within the enclosed chamber, and the second driving structure is provided outside the enclosed chamber.

9. The mattress centrifugal dehydration device of claim 8, wherein the enclosed chamber has an openable and closable chamber door that is provided opposite the inlet and/or outlet of the transport channel when the loading member in the dehydration assembly is in a horizontal state.

10. The mattress centrifugal dehydration device of claim 8, further comprising a water-containing tank provided within the enclosed chamber below the dehydration rack.

* * * * *